May 21, 1957
H. J. HIRE
2,792,639
CLOTHES DRYING APPARATUS
Filed Aug. 17, 1954
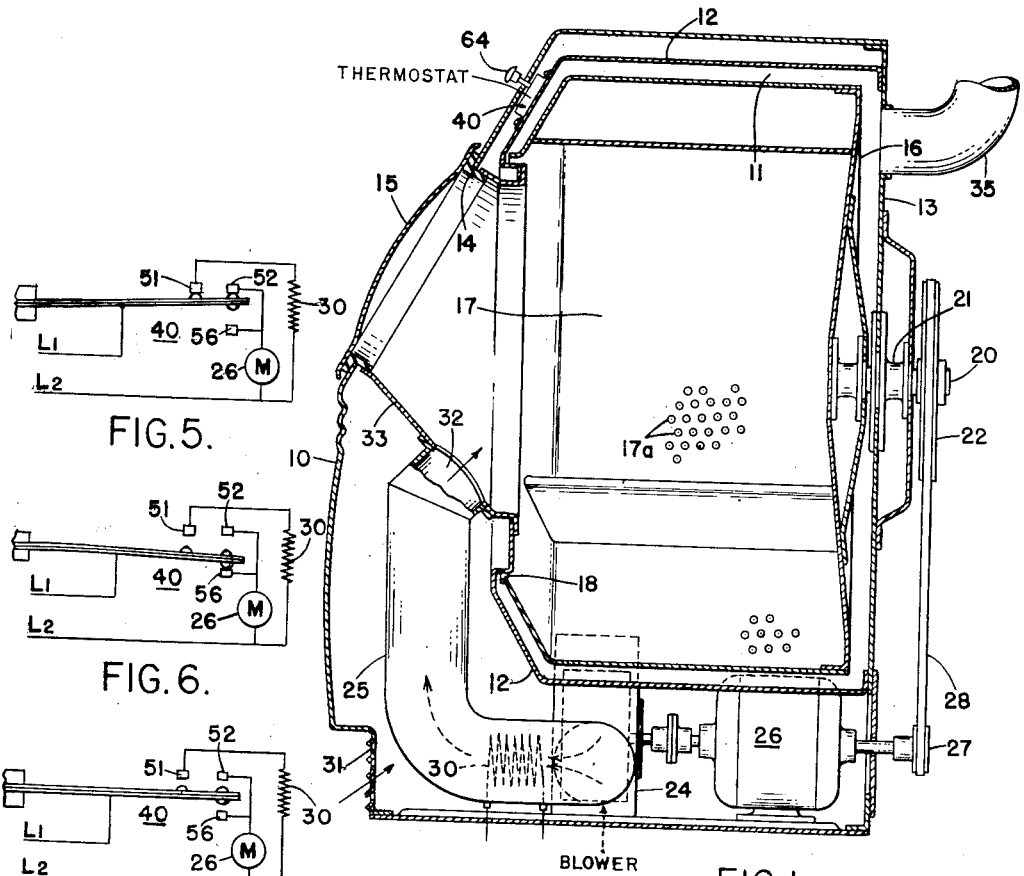
FIG. 1.
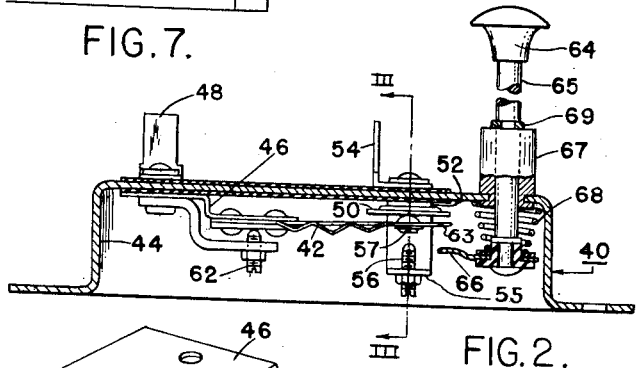
FIG. 5.
FIG. 6.
FIG. 7.
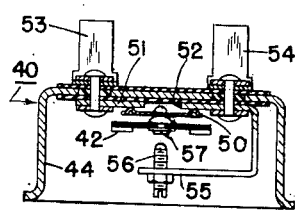
FIG. 2.
FIG. 3.
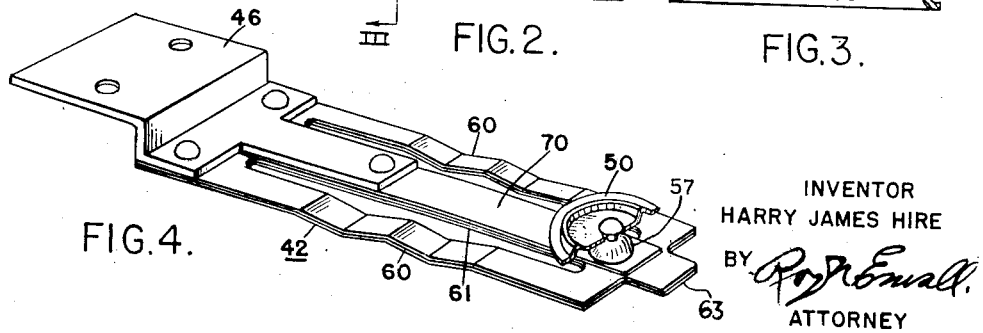
FIG. 4.
INVENTOR
HARRY JAMES HIRE
BY
ATTORNEY

United States Patent Office

2,792,639
Patented May 21, 1957

2,792,639
CLOTHES DRYING APPARATUS

Harry J. Hire, Mansfield, Ohio, assignor to Westinghouse Electric Corporation, East Pittsburgh, Pa., a corporation of Pennsylvania Application August 17, 1954, Serial No. 450,390

1 Claim. (Cl. 34—45)

This invention relates to a thermostatic control for a clothes dryer wherein a thermostat is adjusted to initiate a drying operation, which thermostat automatically terminates the drying operation in response to temperature changes within the dryer. An object of the invention is to provide an improved thermostatic control of this kind.

Numerous control circuits for heated air circulating dryers of either the gas or electrically heated type have been proposed wherein a drying operation is terminated in response to temperature changes within the drying chamber indicative of the dryness of fabrics. It is well known that, even though heated air is being supplied to a drying chamber, the air temperature within the chamber may remain at a relatively low value as long as moisture is being evaporated from the fabrics.

The reason for this is that a major portion of the energy supplied the heater is dissipated as latent heat of vaporization and a relatively small portion as sensible heat. However, when most of the water is evaporated from the fabrics a relatively small portion of the energy supplied the heater is dissipated as latent heat of vaporization and a major portion of the energy as sensible heat which, of course, causes a substantial increase in the dry bulb temperature of the air in the drying chamber. A thermostatically operated switch responsive to dry bulb temperature may be employed to terminate heating in response to a predetermined high temperature of the air in the drying chamber prevailing when the fabrics are in a substantially dry condition.

It is an object of this invention to provide a simple low cost thermostatic control for a clothes dryer of the heated air circulating type.

It is a further object of this invention to provide a thermostatic control means for a heated air circulating clothes dryer in which a complete drying cycle may be initiated by merely pushing or pulling a single button and in which the drying cycle is automatically terminated in response to a condition indicative of dryness of the fabrics, without subjecting the fabrics to undesirably high temperatures.

It is a still further object of this invention to provide a thermostatic control for a clothes dryer which may be manually or otherwise adjusted to initiate a drying operation, and which will automatically deenergize a heater in the air circulating system, prior to the end of the drying cycle, to provide a period during which unheated air is circulated to cool the fabrics within the drying chamber.

This invention incorporates in a dryer, a snap acting switch which may be reset to a first stable position in which air heating and air circulating means are energized, the switch snapping to a second stable position to deenergize the heating means when it senses a predetermined temperature in a drying chamber indicating dryness of the clothes, and which switch may then move to a third position to deenergize the air circulating means when the drying chamber cools, with the switch remaining in this third position at normal room temperatures.

These and other objects are effected by the invention as will be apparent from the following description taken in connection with the accompanying drawings, forming a part of this application, in which:

Fig. 1 is a vertical section of a clothes dryer embodying this invention;

Fig. 2 is a longitudinal section through the thermostatic switch forming a part of this invention;

Fig. 3 is a section taken along the line III—III of Fig. 2;

Fig. 4 is a perspective view of a snap acting bimetal subassembly of the switch shown in Fig. 2;

Fig. 5 is a schematic circuit diagram illustrating the circuit connection made by the thermostatic switch of this invention in its initial active position;

Fig. 6 is a schematic circuit diagram showing the connections made by the thermostatic switch in a second of its active positions; and Fig. 7 is a schematic circuit diagram illustrating the position of the thermostatic switch after completion of a drying operation and before being reset.

Referring to Fig. 1, there appears a clothes dryer having an exterior casing 10 provided with a generally cylindrical drying chamber 11 therein. The drying chamber is bounded at its sides by a cylindrical baffle 12 and at its rear by the rear wall 13 of the casing. The front of said casing is provided with an access opening 14 registering with an opening at the front of the drying chamber 11, the access opening 14 being closed by means of a door 15. A cylindrical drum 16 having a generally cylindrical perforated side wall 17 is mounted in said drying chamber 11 for rotation about a substantially horizontal axis. A few of the perforations are indicated at 17a. An opening 18 in the front end of the drum is aligned with the front opening of the drying chamber. The drum 16 is supported by an axle 20 extending from the rear of the drum through a bearing 21 carried by the rear casing wall 13. The outer end of the drum axle is provided with a pulley 22 for driving the drum.

Below the drying chamber and within the casing there is provided an air circulating means comprising a blower or fan 24 and an air duct 25 extending from the blower to the drying chamber. A motor 26 is provided to drive the blower 24 and also to rotate the drum 16 by means of a suitable pulley 27 belted, as shown at 28, to the pulley 22. A suitable electrical heating element, diagrammatically shown at 30, is provided in the duct 25 for heating the air circulated to said drying chamber 11 during a drying operation.

During operation of the dryer, air is drawn through openings 31 in the toe space and blown by the fan 24 through the duct 25 and over the heating element 30. The heated air then passes into the drying chamber 11 and into the open end of the drum 16 from an opening 32 formed in the lower side of a chute 33 which extends between the access opening 14 of the casing and the front end of the cylindrical baffle 12. Air is exhausted from the drying chamber 11 through an exhaust vent 35 shown in the upper rear wall of the casing.

A thermostatic switch 40 is mounted on the cylindrical baffle 12 to sense changes in the air temperature within said drying chamber. For convenience in providing mechanical linkages to control knobs on the upper front face of the casing to reset the thermostat, it is preferably mounted on the upper side or front of the cylindrical baffle 12.

A suitable thermostatic switch for use in this invention is shown in detail in Figs. 2, 3 and 4. A snap acting bimetal member 42 is supported in a thermostat shell 44 by means of an electrically conducting resilient supporting member 46 riveted or otherwise secured to both the shell and the bimetal. The supporting member is electrically connected to a terminal member 48, but is electrically insulated from the shell 44. Attached to the free end of the bimetal member is a pivoted contact disc 50. In a first position shown in Figs. 2 and 3, the bimetal is in one of its stable positions wherein the contact disc bridges contact members 51 and 52 riveted to but electrically insulated from the shell 44. These contact members 51 and 52 are electrically connected to terminal members 53 and 54, respectively.

The contact member 52 is provided with an electrically conducting portion 55 extending around the end of the bimetal member 42 to support a contact surface shown, by way of example, as an adjustable screw 56 threaded in the extension 55 and fastened by means of a suitable lock nut. Upon reaching a predetermined temperature, the bimetal snaps away from contacts 51 and 52 to a second position in which electrical contact is made between a rivet 57, which pivotally supports the contact disc 50 on the bimetal, and the end of the adjusting screw 56. It will thus be seen that when the bimetal is in the first position shown in Figs. 2 and 3, a circuit is completed from the terminal member 48 to both terminal members 53 and 54. However, when the bimetal snaps to its second position, the circuit will be completed only from the terminal member 48 to terminal member 54.

The snap acting bimetal 42, shown in the illustrated embodiment of the invention, is formed of flat bimetal stock having three parallel legs joined at opposite ends. The outer legs 60 are crimped to shorten them relative the middle leg 61, thereby imposing a compressive stress on the length of the middle leg and causing the bimetal to have two positions of stability in which the middle leg is bowed so that its upper surface is either convex or concave.

A snap acting bimetal member of the type shown in Fig. 4 inherently snaps between the two positions of stability mentioned above when its temperature is changed beyond upper and lower critical values. For example, if the supporting member 46 were held fixed and the contact supporting end of the bimetal were completely free to move, this later end would snap downwardly at a high temperature determined by the physical characteristics of the bimetal, and upon cooling the bimetal would snap upwardly at a lower temperature determined by these same physical characteristics. If the contact end of the bimetal is unrestrained, it will move with a creep action as its temperature changes prior to reaching its snapping temperature. For instance, after snapping to one position in response to a predetermined high temperature, the bimetal will, upon cooling to a lower temperature, move gradually in the opposite direction with a creep action until it reaches a position corresponding to a critical lower temperature, from which position, the bimetal 42 will snap in said opposite direction. It is this creeping characteristic of a snap acting bimetal which is employed in the thermostatic switch 40 forming a part of the present invention.

The upper surface of the bimetal member 42, as seen in Figs. 2 through 7, is the high expansion side, so that the free end of the bimetal 42 snaps to a lower position when the bimetal attains a predetermined high temperature. An adjusting screw 62 is provided to position the resilient supporting member 46 such that the contact disc 50 is properly biased into engagement with the contacts 51 and 52 in the upper position of the bimetal member 42. Because the bimetal is biased in the snapping direction, the movement of the bimetal from its upper to its lower position takes place only by means of snap action upon reaching a temperature determined by the adjustment of the screw 62. The adjusting screw 56 is so positioned relative the bimetal 42 that the screw 56 will be engaged by the contact rivet 57 when the bimetal snaps to its second position, but the force exerted on the bimetal by the contact screw 56 will be small enough to permit the bimetal to move away from the adjusting screw 56 with a creep action upon cooling. At the temperature to which the bimetal normally cools, it will assume an intermediate position spaced from the contacts 51 and 52 and the screw 56 without snapping back to its original position. The bimetal may normally be snapped to the position shown in Fig. 2 only by pulling a control knob 64 on a shaft 65 to cause a resilient reset arm 66 to engage a tab 63 on the free end of the bimetal 42 and pull it over center.

The shaft 65 is supported in the shell 44 by means of a bearing 67. A spring 68 biases the shaft 65 and the resilient arm 66 which is insulatedly supported thereon to the position shown in Fig. 2. A stop washer 69 is fixed on the shaft 65 to limit the movement of the latter under the influence of the biasing spring 68. The resilient arm 66 is made sufficiently flexible to prevent the imposition of damaging stresses on the bimetal when the shaft 65 is pulled beyond the point at which the contact disc 50 engages the contacts 51 and 52.

As seen in Fig. 4, a thin flexible conducting strip 70 may be connected between the supporting member 46 and the contact rivet 57 which supports the contact disc 50. This conducting strip 70 may be of aluminum foil and serves to electrically shunt the bimetal to prevent current which might otherwise heat it from flowing therethrough.

The electrical circuit connections to the thermostat 40, heater 30 and motor 26 are shown in Figs. 5 through 7. The bimetal and the contacts thereon are connected to one line $L_1$ of the power source. The heater 30 is connected between fixed contact 51 and the other line $L_2$ of the power source, whereas the motor 26 is connected between the line $L_2$ and the fixed contacts 52 and 56.

The operation of the dryer control circuit may best be understood by referring to Figs. 5 through 7. After placing the clothes in the drum 16 within the drying chamber, the control knob 64 on the outer end of the thermostat reset shaft 65, which extends through the upper front wall of the dryer casing, is pulled out to reset the thermostat to the position shown in Figs. 2 and 5. This completes the circuit to both the motor 26 and the heater 30. The drum 16 will be rotated and heated air will be circulated therethrough until most of the moisture in the fabrics being dried is evaporated. As the fabrics approach a dry condition, the temperature within the drying chamber will sharply rise to the predetermined value at which the thermostat will snap from its first position shown in Figs. 2 and 5 to the second position shown in Fig. 6 in which only the motor 26 is energized. The drum will continue to rotate and the fan will continue to circulate air through the drum and drying chamber. When the bimetal 42 moves to the position shown in Fig. 6, the heater will be deenergized, and the temperature within the drying chamber will gradually be reduced by the circulating of cooler air therethrough. As the temperature within the drying chamber falls to a second predetermined value, the bimetal 42 will move with a creep action to the intermediate position shown in Fig. 7 at which time the complete drying operation will be terminated by opening the motor circuit. The bimetal will remain in a position intermediate its first and second positions, as shown in Fig. 7, when the temperature within the drying chamber falls to normal room values. The drying cycle described above may again be initiated by manually resetting the bimetal 42 from the position shown in Fig. 7 to the position shown in Fig. 5.

While the invention has been shown in but one form, it will be obvious to those skilled in the art that it is not so limited, but is susceptible of various changes and modifications without departing from the spirit thereof.

What is claimed is:

In a control mechanism for a laundry dryer having a drying chamber for containing fabrics being treated, means for translating air over the fabrics and means for heating the air, the combination of a bimetal element responsive to the temperature within said chamber and movable to first and second active stations and to an intermediate inactive station, said bimetal element being constructed and arranged to snap from its first active station to its second active station when heated to a predetermined high temperature obtaining when the fabrics are dry and to subsequently creep to its inactive station upon cooling to normal room temperatures, manually operated means for actuating the bimetal element from its intermediate inactive station to said first station when initiating a drying cycle and first and second switching means respectively controlling the heating means and the air translating means and actuated by the bimetal element, said first switching means energizing the heating means in the first active station of the bimetal element and deenergizing the heating means in other stations and said second switching means energizing the air translating means in the first and second active stations of the bimetal element and deenergizing the air translating means in the inactive station of the bimetal element.

References Cited in the file of this patent

UNITED STATES PATENTS

| | | |
|---|---|---|
| 2,505,041 | Garsuch | Apr. 25, 1950 |
| 2,564,868 | Weber et al. | Aug. 21, 1951 |